US005326622A

United States Patent [19]

Yamane et al.

[11] Patent Number: 5,326,622

[45] Date of Patent: Jul. 5, 1994

[54] HEAT TRANSFERABLE INKED RIBBON

[75] Inventors: Mitsuo Yamane, Yokkaichi; Takashi Kawaguchi, Nishikasugai, both of Japan

[73] Assignee: Brother Kogyo Kabushiki Kaisha, Nagoya, Japan

[21] Appl. No.: 929,411

[22] Filed: Aug. 14, 1992

Related U.S. Application Data

[63] Continuation-in-part of Ser. No. 601,368, Oct. 23, 1990, abandoned.

[30] Foreign Application Priority Data

Oct. 27, 1989 [JP] Japan .............................. 1-281511

Oct. 27, 1989 [JP] Japan .............................. 1-281523

[51] Int. Cl.[5] .......................... B32B 3/00; B32B 7/06; B32B 7/10

[52] U.S. Cl. .................................. 428/200; 428/195; 428/474.4; 428/480; 428/484; 428/488.1; 428/488.4; 428/497; 428/500; 428/913; 428/914

[58] Field of Search ..................... 428/195, 484, 488.1, 428/488.4, 913, 914, 200, 474.4, 480, 484, 488.1, 497, 500

[56] References Cited

U.S. PATENT DOCUMENTS 4,954,390 9/1990 Koshizuka et al. ................ 428/195
5,024,887 6/1991 Yamane ............................. 428/335
5,064,743 11/1991 Koshizuka et al. ................ 428/195
5,106,676 4/1992 Sato et al. .

FOREIGN PATENT DOCUMENTS 63-128990 6/1988 Japan .
63-128991 6/1988 Japan .
63-246280 10/1988 Japan .
63-251287 10/1988 Japan .
1-97687 4/1989 Japan .
1-97688 4/1989 Japan .
1-103492 4/1989 Japan .
1-36782 5/1989 Japan .

*Primary Examiner*—Patrick J. Ryan
*Assistant Examiner*—William A. Krynski
*Attorney, Agent, or Firm*—Oliff & Berridge

[57] ABSTRACT

The present invention provides an improved heat transferable inked ribbon for preparing pressure transferable laminates. The inked ribbon includes a film base coated with an ink layer, which has high pressure sensitive adhesiveness, and further with a control layer, which includes a colorant and has high heat sensitive adhesiveness, viscosity, cohesive forces and hardness. Alternatively, the inked ribbon includes a film base coated with an incident rays reflecting layer, which contains white pigment and has high pressure sensitive adhesiveness, with an ink layer, which has high pressure sensitive adhesiveness, and further with a control layer, which has high heat sensitive adhesiveness, viscosity, cohesive forces and hardness. The inked ribbon thus constructed is efficiently and effectively transferred onto a sheet or film with poor wetting properties upon the application of heat; and the heat transferred image is also efficiently transferred from the sheet or film onto an article upon the application of pressure. The incident rays reflecting layer or addition of the colorant to the control layer enables the transferred image to possess increased hiding power.

26 Claims, 1 Drawing Sheet

HEAT TRANSFERABLE INKED RIBBON

This application is a continuation-in-part of Ser. No. 07/601,368 filed Oct. 23, 1990 and abandoned Aug. 14, 1992.

BACKGROUND OF THE INVENTION

The present invention relates to a heat transferable inked ribbon for providing a pressure transferable laminate, and more particularly to a heat transferable inked ribbon for use in heat transfer printing devices, e.g., printers, typewriters or word-processors, which is efficiently and effectively transferred onto a sheet or film with release properties and poor wetting properties upon application of heat to provide a composite laminate, which is transferred from the sheet or film onto an article upon application of pressure.

Heat transfer printing devices like printers, typewriters, or word-processors have been developed and widely applied to individual and office use. In such printing devices, as specific heat elements on a thermal head are heated, part of a thermoplastic ink layer of an inked ribbon corresponding to the specific heat elements softens and is transferred onto a sheet of paper or film. Here, the thermoplastic ink layer is in contact with the heat elements of the thermal head via a heat transferable ribbon base.

A general heat transferable ribbon includes a base or support coated with a thermoplastic ink layer, which contains a colorant and a binder mainly composed of wax. The general inked ribbon is transferred only onto ordinary printing or typing paper upon application of heat.

The owner of this invention has already disclosed an improved heat transferable inked ribbon, which is transferred onto a sheet or film with release properties and poor wetting properties as well as onto an ordinary sheet, in Japanese Published Unexamined Patent Application No. Sho-61-275538, No. Sho-61-275539 and No. Sho-62-85350, and also disclosed a heat transferable inked ribbon with improved heat sensitivity in Japanese Published Unexamined Patent Application No. Sho-62-80126.

In a general heat transfer system, as a thermal head moves, ribbon is continuously drawn out from a ribbon cassette by friction between an ink layer of the ribbon and a printing sheet and is wound up in due course.

The surface of a sheet or film with release properties and poor wetting properties has small friction and may thus not give sufficient forces to draw out and feed a ribbon. In this case, the ribbon is not sufficiently fed and the head strikes the same part of the ribbon many times; in other words, the head slips on the ribbon. On the other hand, when only a small force is required for drawing out the ribbon, the ribbon is not stretched sufficiently and thus does not run straight. The force for drawing out the ribbon varies depending on storage conditions including temperature and period.

Also already disclosed is a heat transferable inked ribbon, which is unchangeably and stably stored and runs straight without causing a slip in a printing device, in Japanese Published Unexamined Patent Applications No. Sho-62-255761, No. Sho-62-255762, No. Sho-62-262348 and No. Sho-62-297155.

The heat transferable inked ribbon is generally transferred onto a white sheet, where only a low hiding power is required. However, when the inked ribbon is transferred onto a sheet or film of various properties and colors to provide a pressure transferable laminate, a high hiding power is required. The hiding power of colorants except black is not sufficiently high, and hence a transferred image does not have a sufficient hiding power, either; that is, the transferred image on the sheet is not clear. No prior publications have dealt with inked ribbons from this aspect.

One objective of the invention is accordingly to provide an improved heat transferable inked ribbon for preparing a pressure transferable laminate.

Another objective of the invention is to provide a heat transferable inked ribbon which is effectively and efficiently transferred onto a sheet or film with poor wetting properties to form a pressure transferable laminate.

A further objective of the invention is to provide a heat transferable inked ribbon, wherein the heat transferred image or composite laminate is easily and completely transferred from a sheet or film onto an article upon application of pressure.

Another important objective of the invention is to provide a heat transferable inked ribbon which is easily stored and maintained.

Still another objective of the invention is to provide a heat transferable inked ribbon which runs straight without causing slipping when used in a printing device.

A still further objective of the invention is to provide a heat transferable inked ribbon which is efficiently and firmly transferred onto a sheet or film even when the colorant used has a small hiding power.

SUMMARY OF THE INVENTION

The above and other related objectives are realized by a heat transferable inked ribbon, which is transferred onto a sheet or film upon application of heat. The ribbon includes a base film, an ink layer in contact with the base film and a control layer over the ink layer. The ink layer contains a colorant, a binder and a pressure sensitive adhesive. The control layer contains a thermoplastic resin, a tackifying resin and a colorant and has a higher viscosity, heat sensitive adhesiveness, cohesive forces and hardness than the ink layer.

BRIEF DESCRIPTION OF THE DRAWINGS

The invention may be best understood by referring to the following examples and the accompanying drawings, wherein like numerals denote like elements and in which.

DESCRIPTION OF THE INVENTION

Figure 1:
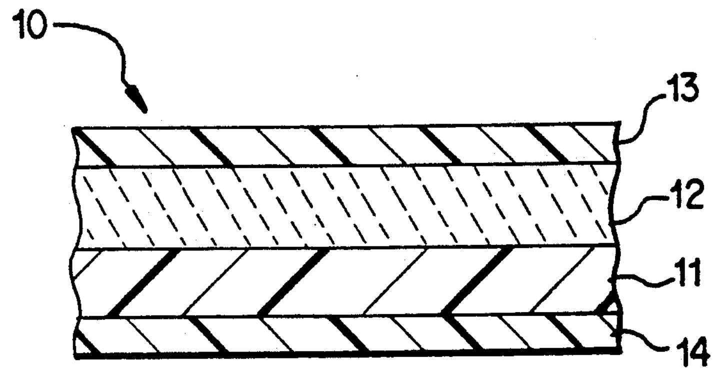
FIG. 1 is a cross sectional view illustrating a first embodiment of a heat transferable inked ribbon according to the invention.

A first embodiment of the heat transferable inked ribbon of this invention is shown in FIG. 1. An inked ribbon 10 includes a base film or support 11, an ink layer 12, a control layer 13 and an anti-sticking layer 14. The base film or support 11 is coated with the ink layer 12 and further with the control layer 13 of a specific thickness. The opposite face of the base film 11 is coated with the anti-sticking layer 14 composed of a heat resistant resin such as silicone resin.

In accomplishing the above and other related objectives, the invention may further provide a heat transferable inked ribbon, which is transferred onto a sheet or film upon application of heat. The ribbon includes a base film, an incident rays reflecting layer in contact with the base film, an ink layer over the base film and a control layer further over the ink layer. The incident rays reflecting layer contains a white pigment, a binder and a pressure sensitive adhesive, and the ink layer contains a colorant, a binder and a pressure sensitive adhesive. The control layer contains a thermoplastic resin, a tackifying resin and has a higher viscosity, heat sensitive adhesiveness, cohesive forces and hardness than the ink layer.

Figure 2:
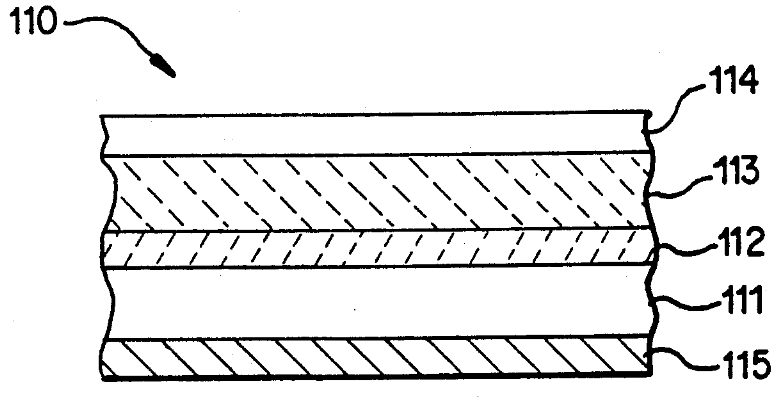
FIG. 2 is a cross sectional view illustrating second embodiment of a heat transferable inked ribbon according to the invention.

A second embodiment of the heat transferable inked ribbon thus constructed is shown in FIG. 2. An inked ribbon 110 includes a base film or support 111, an incident rays reflecting layer 112, an ink layer 113, a control layer 114 and an anti-sticking layer 115. The base film or support 111 is coated with the incident rays reflecting layer 112 and further with the ink layer 113 and the control layer 114 of a specific thickness. The opposite face of the base film 111 is coated with the anti-sticking layer 115 composed of a heat resistant resin such as silicone resin.

The base film 11 or 111 may be composed of any conventional base material; however, since the thermal head is in contact with the base film 11 or 111 of the inked ribbon 10 or 110, a material resistible to 150° C. or a higher temperature is preferable. The base 11 or 111 may be condenser paper, glassine paper or a plastic film composed of polyester, polyimide, polycarbonate, polysulfone, poly(sulfone ether) or poly(phenylene sulfide). The thickness of the base 11 or 111 is determined depending on the material but 3 to 20 μm is preferable.

The incident rays reflecting layer 112 provided between the base film 111 and the ink layer 113, contains a white pigment, a binder and a pressure sensitive adhesive. Rays do not pass through pressure transferred image on an article but are reflected by the incident rays reflecting layer 112 of the image. Namely, the pressure transferred image on the article is clear even when a colorant with a small hiding power is used for the ink layer 113.

The white pigment used may be titanium oxide, zinc oxide or lithopone.

The binder contains wax and a tackifying resin. The wax may be one or more chosen from vegetable waxes like candelilla wax, carnauba wax, rice wax and Japan wax, animal waxes like beeswax, lanolin and spermaceti, mineral waxes like montan wax and ceresin, crystalline waxes like paraffin wax and microcrystalline wax, and plastic wax like α-olefin—maleic anhydride copolymer. The tackifying resin improves the stickiness, adhesiveness, hardness and cohesive forces of the ink layer 113 as well as the adhesiveness of the pressure sensitive adhesive and may be chosen from petroleum resins, rosins, ketone resins, polyamide resins and phenol resins. The weight ratio of the wax to the tackifying resin in the binder is in a range between 1:0 to 3:2.

The pressure sensitive adhesive may be one or more chosen from vinyl polymers like poly(vinyl chloride), polyacrylate, ethylene—vinyl acetate copolymer, ethylene—ethyl acrylate copolymer, poly(vinyl acetate), poly(vinyl ether), poly(vinyl acetal) and polyisobutylene, cellulose polymers like ethyl cellulose, nitrocellulose and cellulose acetate, and rubbers like chlorinated rubber and natural rubber.

The white pigment, the binder and the pressure sensitive adhesive are mixed in the incident rays reflecting layer 112 in the weight ratio of 5 through 50:30 through 93:0 through 20. The resultant mixture has a viscosity of lower than 3,000 centipoise, and preferably 50 through 1,000 centipoise at 95° C. The mixture is dissolved or dispersed in a specified solvent to form a solution or dispersion or is melted upon application of heat. The reflecting layer 112 is coated or hot melt coated on the film base 111 by any of several known methods.

The ink layer 12 or 113 contains a colorant, a binder and a pressure sensitive adhesive.

The colorant is a pigment such as carbon black. A dye may be added to control the tone, if desired.

The binder contains wax and a tackifying resin. The wax may be one or more chosen from vegetable waxes like candelilla wax, carnauba wax, rice wax and Japan wax, animal waxes like beeswax, lanolin and spermaceti, mineral waxes like montan wax and ceresin, crystalline waxes like paraffin wax and microcrystalline wax, and plastic wax like α-olefin—maleic anhydride copolymer. The tackifying resin improves the stickiness, adhesiveness, hardness and cohesive forces of the ink layer 12 or 113 as well as the adhesiveness of the pressure sensitive adhesive and may be chosen from petroleum resins, rosins, ketone resins, polyamide resins and phenol resins. The weight ratio of the wax to the tackifying resin in the binder is in a range between 15:1 to 3:2.

The pressure sensitive adhesive may be one or more chosen from vinyl polymers like poly(vinyl chloride), polyacrylate, ethylene—vinyl acetate copolymer, ethylene—ethyl acrylate copolymer, poly(vinyl acetate), poly(vinyl ether), poly(vinyl acetal) and polyisobutylene, cellulose polymers like ethyl cellulose, nitrocellulose and cellulose acetate, and rubbers like chlorinated rubber and natural rubber.

The colorant, the binder and the pressure sensitive adhesive are mixed in the ink layer 12 or 113 in the weight ratio of 5 through 50:30 through 93:2 through 20. The resultant mixture has a viscosity of lower than 3,000 centipoise, and preferably 200 through 1,000 centipoise at 95° C. The mixture is dissolved or dispersed in a specified solvent to form a solution or dispersion or is melted upon application of heat. The ink layer 12 or 113 is respectively coated or hot melt coated on the film base 11 or the incident rays reflecting layer 112 by any of several known methods.

The control layer 13 or 114 contains a thermoplastic resin or resins, which readily form a coat with high heat sensitive adhesiveness, and a tackifying resin or resins with high cohesive forces. The thermoplastic resin may be one or more chosen from ethylene—vinyl acetate copolymer, poly(vinyl acetate), ionomer, acrylic polymer, ethylene—ethyl acrylate copolymer, ethylene—acrylic acid copolymer, vinyl chloride - vinyl acetate copolymer, poly (vinyl butyral), poly(vinylpyrrolidone), poly(vinyl alcohol), polyamide, ethyl cellulose and polyolefin. The tackifying resin may be one or more chosen from petroleum resins, rosins, water-containing rosins, rosin esters, ketone resins, and phenol resins. The control layer 13 further includes a colorant such as a pigment or a dye which is not talc or titanium dioxide. A colorant may also be added to the control layer 114 to improve the hiding power and a dye may be added to the control layer 13 or 114 to control the tone. The thermoplastic resin, the tackifying resin and the colorant are mixed in the control layer 13 in the weight ratio of 5 through 10:5 through 10:1 through 20. The thermoplastic resin and the tackifying resin are mixed in the control layer 114 in the weight ratio of 5 through 10:5 through 10.

Examples of colorants suitable for use in the control layer 13 include but are not limited to inorganic pigments such as carbon black, iron oxide, white lead, red lead, chrome yellow, vermilion, ultramarine blue, iron blue, cobalt oxide, strontium chromate, titanium yellow, black-titanium oxide, black iron oxide, molybdenum white, lithopone, and cobalt blue; inorganic pigments such as azo, phthalocyanine blue, lake, isoindolinone, quinacridone, dioxazineviolet, perinone, and perylene; and dyes such as disperse dyes, cationic dyes, basic dyes, acid dyes, metal complex dyes, reactive dyes, direct dyes, sulphur dyes, sulphur vat dyes, vat dyes, azoic dyes, solvent dyes and pigment resin colors.

The thermoplastic resin is sparingly miscible or immiscible with the ink layer 12 or 113 and forms a layer with high heat sensitive adhesiveness on the ink layer 12 or 113. The tackifying resin improves the adhesiveness between the above resin and the ink layer 12 or 113 as well as cohesive forces, hardness and viscosity and controls heat transfer.

The mixture of the thermoplastic resin and the tackifying resin or the mixture of the thermoplastic resin, the tackifying resin and the colorant is dissolved or dispersed in water or an organic solvent, which does not permeate into the ink layer 12 or 113, to form a solution or dispersion. The control layer 13 or 114 of a specified thickness is coated on the ink layer 12 or 113 by any known method. The control layer 13 or 114 obtained has a higher viscosity than the ink layer 12 or 113 under the heat transfer conditions; viscosity is 3,000 centipoise or higher, and preferably higher than 10,000 centipoise at 95° C.

The control layer 13 or 114 also has higher heat sensitive adhesiveness, cohesive forces and hardness than the ink layer 12 or 113. The high adhesiveness enables the ink layer 12 or 113 to be efficiently and effectively transferred onto a sheet or film with poor wetting properties upon the application of heat. The high cohesive forces, viscosity and hardness prevent inferior heat transfer and ink migration as well as scratching of the ink by the thermal head of a printing device. The control layer 13 or 114, because of its high cohesive forces and hardness, enables the heat transferred image or composite laminate to be transferred from the sheet or film onto an article easily and completely upon the application of pressure. The control layer 13 or 114 also prevents inferior pressure transfer and ink migration and protects the pressure transferred image. Addition of the colorant to the control layer causes the same effect as the thick ink layer and thus even a colorant with a small hiding power gives sufficient hiding power to the pressure transferred image.

The control layer 13 or 114 may further contain less than 20% by weight of a filling agent like kaolin, talc, bentonire or titanium oxide, or organic or inorganic powder like zinc stearate or aluminum stearate so as to strengthen the control layer, to obtain the clear and sharp transferred image, to keep out dirt and to prevent blocking. The control layer 13 or 114 may also include less than 10% by weight of silicone resin, silicone oil or silicone powder so as to allow the inked ribbon to run straight without causing slipping, to prevent blocking or poor winding even when stored at a temperature higher than room temperature, e.g., 55° C., and to obtain a stable pressure transferred image.

The inked ribbon 10 or 110 thus constructed is preferably used in a printing device such as a heat transfer printer with the shape of the thermal head, the position of the thermal head, the angle of heat attachment, the pressure applied on the head, the winding torque, the energy applied to the head and the printing speed all adjustable and controlled.

The inked ribbon 10 or 110 is effectively and efficiently transferred onto a sheet or film with poor wetting properties upon the application of heat; it does not cause any inferior heat transfer, ink migration, color gradation, cobwebbing, orange peel or scratching of the ink by the head.

The heat transferred image or composite laminate is transferred from the sheet or film onto an article composed of paper, plastics or metal easily and completely upon application of pressure. The pressure transferred image obtained is sharp and clear and has a high hiding power.

The inked ribbon 10 or 110 is easily stored and maintained. It does not cause blocking or poor winding even when stored at a temperature higher than room temperature, e.g., 55° C. for 24 hours. The inked ribbon 10 or 110 runs straight in the printing device without causing slipping and is usable up to the end.

EXAMPLES

Examples of the invention as built and tested are explained below.

Since there may be many modifications without departing from the scope of the invention, the examples below are not intended to limit the invention to the examples but are only intended to illustrate the invention more clearly.

Examples 1 through 3 were prepared according to the first embodiment of the invention.

EXAMPLE 1

The following compositions were respectively prepared for the ink layer 12 and the control layer 13. The viscosity of the ink layer 12 was 300 centipoise at 95° C. and that of the control layer 13 was approximately 100,000 centipoise at 95° C.

All the compositions are shown by parts by weight.

| | |
|---|---|
| Composition of ink layer 12 | |
| α-olefin - maleic anhydride copolymer [Diacarna 30 by Mitsubishi Chemical Industries Ltd.] | 2 |
| Candelilla wax [Candelilla wax 2698 by Chukyo Oil and Fat Co, Ltd.] | 3 |
| Microcrystalline wax [Hi-Mic 1045 by Nippon Seiro Co., Ltd.] | 9 |
| Rosin ester [Super ester A-100 by Arakawa Chemical Industries ltd.] | 2 |
| Ethylene - vinyl acetate copolymer [EVA210 by Mitsui Dupont Chemical Ltd.] | 2 |
| Titanium oxide [Tipaque R-580 by Ishihara Industries Ltd.] | 10 |
| Methyl isobutyl ketone (solvent) | 100 |
| Composition of control layer 13 | |
| Polyamide [Sunmide 615A by Sanwa Chemical Industries Ltd.] | 11 |
| Rosin ester [Super ester A-100 by Arakawa Chemical Industries Ltd.] | 9 |
| Titanium oxide [Tipaque R-580 by Ishihara Industries Ltd.] | 16 |
| Isopropyl alcohol (solvent) | 69 |

A poly(ethylene terephthalate) (PET) film 3.5 μm thick was used as the film base 11. The film base 11 was coated with the ink layer 12 of 6 to 7 μm thickness and was further coated with the control layer 13 of 1 to 2 μm thickness. The composite layers were dried at 90° C. to provide the inked ribbon 10.

The inked ribbon 10 was set in a heat transfer printing device (P-touch by BROTHER KOGYO KABUSHIKI KAISHA) appropriately adjusted. The type faces were struck on the inked ribbon 10 at a temperature between 10° through 35° C. and the corresponding part of the inked ribbon 10 was efficiently transferred onto a polyethylene film of 100 μm thickness coated with silicone resin. The transferred image obtained was sufficiently clear and firm. The heat transferred image was then completely transferred from the polyethylene film onto an article composed of paper, plastics or metal by the application of pressure. The pressure transferred image obtained was also clear and had a sufficient hiding power.

An inked ribbon newly prepared and one stored at 55° C. for 24 hours were compared in use. Neither blocking nor poor winding was observed as to both the new and 55° C.-stored ribbons. Both ribbons ran straight without causing slipping.

EXAMPLE 2

The inked ribbon 10 was prepared in the same manner as Example 1 using the following compositions. The same experiments as Example 1 were performed as to the inked ribbon of Example 2. The heat transferred image obtained was sufficiently clear and firm and was completely and easily transferred onto an article. The pressure transferred image obtained was also clear and had a sufficient hiding power. Neither blocking nor poor winding was observed for the ribbon, and the ribbon prepared ran straight without causing slipping. The viscosity of the ink layer 12 was 730 centipoise at 95° C. and that of the control layer 13 was approximately 100,000 centipoise at 95° C.

| | |
|---|---|
| Composition of ink layer 12 | |
| α-olefin - maleic anhydride copolymer [Diacarna 30 by Mitsubishi Chemical Industries Ltd.] | 8 |
| Candelilla wax [Candelilla wax 2698 by Chukyo Oil and Fat Co, Ltd.] | 5 |
| Rosin ester [Super ester A-100 by Arakawa Chemical Industries Ltd.] | 2 |
| Ethylene - vinyl acetate copolymer [EVA210 by Mitsui Dupont Chemical Ltd.] | 3 |
| Azo organic pigment [CROMOPHTAL Yellow 3G by Ciba-geigy] | 12 |
| Methyl isobutyl ketone (solvent) | 100 |
| Composition of control layer 13 | |
| Ionomer [Chemipearl SA-100 by Mitsui Petrochemical Industries Ltd.] | 10 |
| Water-containing Rosin [SE-50 by Arakawa Chemical Industries Ltd.] | 10 |
| Azo organic pigment [CROMOPHTAL Yellow 3G by Ciba-geigy] | 10 |
| Silicone oil [KP360 by Shinetsu Chemical Industries Ltd.] | 1 |
| Water (solvent) | 68 |

EXAMPLE 3

The inked ribbon 10 was prepared in the same manner as Example 1 using the following compositions. The same experiments as Example 1 were performed as to the inked ribbon of Example 3. The heat transferred image obtained was sufficiently clear and firm and was completely and easily transferred onto an article. The pressure transferred image obtained was also clear and had a sufficient hiding power. Neither blocking nor poor winding was observed for the ribbon; and, the ribbon prepared ran straight without causing slipping. The viscosity of the ink layer 12 was 730 centipoise at 95° C. and that of the control layer 13 was approximately 100,000 centipoise at 95° C.

| | |
|---|---|
| Composition of ink layer 12 | |
| α-olefin - maleic anhydride copolymer [Diacarna 30 by Mitsubishi Chemical Industries Ltd.] | 8 |
| Candelilla wax [Candelilla wax 2698 by Chukyo Oil and Fat Co, Ltd.] | 5 |
| Rosin ester [Super ester A-100 by Arakawa Chemical Industries Ltd.] | 2 |
| Ethylene - vinyl acetate copolymer [EVA210 by Mitsui Dupont Chemical Ltd.] | 3 |
| Azo organic pigment [IRGALITE Yellow CG by Ciba-geigy] | 12 |
| Methyl isobutyl ketone (solvent) | 100 |
| Composition of control layer 13 | |
| Ethyl Cellulose [Sample (10 cps) by Kanto Chemical Industries Ltd.] | 20 |
| Ketone resin [Ketone resin K-90 by Arakawa Chemical Industries Ltd.] | 25 |
| Azo organic pigment [IRGALITE Yellow CG by Ciba-geigy] | 40 |
| Silicone fine powder [Torefil R-900 by Toray Silicone Ltd.] | 1 |
| Isopropyl alcohol (solvent) | 70 |

REFERENCES 1-3

The inked ribbon of Reference 1 included the same composition of the ink layer 12 as Example 1 but did not include the control layer 13. Reference 2 included the same composition of the ink layer 12 as Example 2 but did not include the control layer 13. Reference 3 was a heat transferable inked ribbon including wax, marketed by Fuji Chemical Pulp Industries Ltd. Experiments for evaluating the heat and pressure transfer abilities were performed in the same manner as Example 1. References 1 through 3 all showed insufficient heat and pressure transfer abilities. Various problems were observed on heat transfer; e.g., inferior transfer, scratching of the ink by the head, color gradation, cobwebbing and orange peel due to low adhesiveness, cohesive forces, viscosity and hardness. On pressure transfer, the same problems and also incomplete transfer from the sheet to the article were observed. The hiding power of the transferred image was also not sufficient.

REFERENCES 4-6

Inked ribbons of References 4 through 6 had similar compositions to Examples 1 through 3 respectively, except for the colorant of the control layer 13; that is, the control layer of Reference 4, 5 or 6 did not contain the colorant. Experiments for evaluating the heat and pressure transfer abilities were performed. The transferred image was not clear but fuzzy due to the low hiding power.

Examples 4 through 6 were prepared according to the second embodiment.

EXAMPLE 4

The following compositions were respectively prepared for the incident rays reflecting layer 112, the ink layer 113 and the control layer 114. The viscosity of the incident rays reflecting layer 112 was 300 centipoise at 95° C., that of the ink layer 113 was 730 centipoise at 95°

C. and that of the control layer 114 was approximately 100,000 centipoise at 95° C.

All the compositions are shown by parts by weight.

| | |
|---|---|
| Composition of incident rays reflecting layer 112 | |
| α-olefin - maleic anhydride copolymer [Diacarna 30 by Mitsubishi Chemical Industries Ltd.] | 2 |
| Candelilla wax [Candelilla wax 2698 by Chukyo Oil and Fat Co, Ltd.] | 3 |
| Microcrystalline wax [Hi-Mic 1045 by Nippon Seiro Co., Ltd.] | 9 |
| Rosin ester [Super ester A-100 by Arakawa Chemical Industries Ltd.] | 2 |
| Ethylene - vinyl acetate copolymer [EVA210 by Mitsui Dupont Chemical Ltd.] | 2 |
| Titanium oxide [Tipaque R-820 by Ishihara Industries Ltd.] | 15 |
| Methyl isobutyl ketone (solvent) | 100 |
| Composition of ink layer 113 | |
| α-olefin - maleic anhydride copolymer [Diacarna 30 by Mitsubishi Chemical Industries Ltd.] | 8 |
| Candelilla wax [Candelilla wax 2698 by Chukyo Oil and Fat Co, Ltd.] | 5 |
| Rosin ester [Super ester A-100 by Arakawa Chemical Industries Ltd.] | 2 |
| Ethylene - vinyl acetate copolymer [EVA210 by Mitsui Dupont Chemical Ltd.] | 3 |
| Azo organic pigment [CROMOPHTAL Yellow 3G by Ciba-geigy] | 12 |
| Methyl isobutyl ketone (solvent) | 100 |
| Composition of control layer 114 | |
| Ionomer [Chemipearl SA-100 by Mitsui Petrochemical Industries Ltd.] | 12 |
| Water-containing Rosin [SE-50 by Arakawa Chemical Industries Ltd.] | 9 |
| Silicone oil [KP-316 by Shinetsu Chemical Industries Ltd.] | 1 |
| Water (solvent) | 78 |

A poly(ethylene terephthalate) (PET) film of 3.5 μm thickness was used as the film base 111. The film base 111 was coated with an incident rays reflecting layer 112 of 1 to 2 μm thick, and then with an ink layer 113 of 5 to 6 μm thick and was further coated with a control layer 114 of 1 to 2 μm thick. The composite layers were dried at 90° C. to provide the inked ribbon 110.

The inked ribbon 110 was set in a heat transfer printing device (P-touch by BROTHER KOGYO KABUSHIKI KAISHA) appropriately adjusted. The type faces were struck on the inked ribbon 110 at a temperature between 10° through 35° C. and the corresponding part of the inked ribbon 110 was efficiently transferred onto a polyethylene film of 100 μm thickness coated with silicone resin. The transferred image obtained was sufficiently clear and firm. The heat transferred image was then completely transferred from the polyethylene film onto an article composed of paper, plastics or metal upon the application of pressure. The pressure transferred image obtained was also clear and had a sufficient hiding power.

An inked ribbon newly prepared and one stored at 55° C. for 24 hours were compared in use. Neither blocking nor poor winding was observed as to both the new and the 55° C.-stored ribbons. Both ribbons ran straight without causing slipping.

EXAMPLE 5

The inked ribbon 110 was prepared in the same manner as Example 4 using the following compositions. The same experiments as Example 4 were performed as to the inked ribbon of Example 5. The heat transferred image obtained was sufficiently clear and firm and was completely and easily transferred onto an article. The pressure transferred image obtained was also clear and had a sufficient hiding power. Neither blocking nor poor winding was observed for the ribbon; and, the ribbon prepared ran straight without causing slipping. The viscosity of the incident rays reflecting layer 112 was 300 centipoise at 95° C., that of the ink layer 113 was 730 centipoise at 95° C. and that of the control layer 114 was approximately 100,000 centipoise at 95° C.

| | |
|---|---|
| Composition of the incident rays reflecting layer 112 | |
| α-olefin - maleic anhydride copolymer [Diacarna 30 by Mitsubishi Chemical Industries Ltd.] | 2 |
| Candelilla wax [Candelilla wax 2698 by Chukyo Oil and Fat Co, Ltd.] | 3 |
| Microcrystalline wax [Hi-Mic 1045 by Nippon Seiro Co., Ltd.] | 9 |
| Rosin ester [Super ester A-100 by Arakawa Chemical Industries Ltd.] | 2 |
| Ethylene - vinyl acetate copolymer [EVA210 by Mitsui Dupont Chemical Ltd.] | 2 |
| Titanium oxide [Tipaque R-580 by Ishihara Industries Ltd.] | 10 |
| Methyl isobutyl ketone (solvent) | 100 |
| Composition of ink layer 113 | |
| α-olefin - maleic anhydride copolymer [Diacarna 30 by Mitsubishi Chemical Industries Ltd.] | 8 |
| Candelilla wax [Candelilla wax 2698 by Chukyo Oil and Fat Co, Ltd.] | 5 |
| Rosin ester [Super ester A-100 by Arakawa Chemical Industries Ltd.] | 2 |
| Ethylene - vinyl acetate copolymer [EVA210 by Mitsui Dupont Chemical Ltd.] | 3 |
| Organic pigment [IRGALITE Orange P by Ciba-geigy] | 12 |
| Methyl isobutyl ketone (solvent) | 100 |
| Composition of control layer 114 | |
| Polyamide [Sunmide 615A by Sanwa Chemical Industries Ltd.] | 12 |
| Rosin ester [Super Ester A-115 by Arakawa Chemical Industries Ltd.] | 9 |
| Silicone fine powder [Tospearl 130 by Toray Silicone Ltd.] | 2 |
| Isopropyl alcohol (solvent) | 68 |

EXAMPLE 6

The inked ribbon 110 was prepared in the same manner as Example 4 using the following compositions. The same experiments as Example 4 were performed as to the inked ribbon of Example 6. The heat transferred image obtained was sufficiently clear and firm and was completely and easily transferred onto an article. The pressure transferred image obtained was also clear and had a sufficient hiding power. Neither blocking nor poor winding was observed for the ribbon; and, the ribbon prepared ran straight without causing slipping. The viscosity of the incident rays reflecting layer 112 was 300 centipoise at 95° C., that of the ink layer 113 was 730 centipoise at 95° C. and that of the control layer 114 was approximately 100,000 centipoise at 95° C.

| | |
|---|---|
| Composition of incident rays reflecting layer 112 | |
| α-olefin - maleic anhydride copolymer [Diacarna 30 by Mitsubishi Chemical Industries Ltd.] | 2 |
| Candelilla wax [Candelilla wax 2698 by Chukyo Oil and Fat Co, Ltd.] | 3 |
| Microcrystalline wax [Hi-Mic 1045 by Nippon Seiro Co., Ltd.] | 9 |
| Rosin ester [Super ester A-100 by Arakawa Chemical Industries Ltd.] | 2 |
| Ethylene - vinyl acetate copolymer [EVA210 by Mitsui Dupont Chemical Ltd.] | 2 |

-continued

| | |
|---|---|
| Titanium oxide | 10 |
| [Super ester A-100 by Ishihara Industries Ltd.] | |
| Methyl isobutyl ketone (solvent) | 100 |
| Composition of ink layer 113 | |
| α-olefin - maleic anhydride copolymer | 8 |
| [Diacarna 30 by Mitsubishi Chemical Industries Ltd.] | |
| Candelilla wax | 5 |
| [Candelilla wax 2698 by Chukyo Oil and Fat Co, Ltd.] | |
| Rosin ester | 2 |
| [Super ester A-100 by Arakawa Chemical Industries Ltd.] | |
| Ethylene - vinyl acetate copolymer | 3 |
| [EVA210 by Mitsui Dupont Chemical Ltd.] | |
| Organic pigment | 12 |
| [IRGALITE Yellow CG by Ciba-geigy] | |
| Methyl isobutyl ketone (solvent) | 100 |
| Composition of control layer 114 | |
| Ethyl cellulose | 20 |
| [Sample (10 cps) by Kanto Chemical Ltd.] | |
| Ketone resin | 25 |
| [Ketone resin K-90 by Arakawa Chemical Industries Ltd.] | |
| Silicone fine powder | 1 |
| [Torefil R-900 by Toray Silicone Ltd.] | |
| Isopropyl alcohol (solvent) | 70 |

REFERENCES 7-9

The inked ribbon of Reference 7 included the same composition as Example 4 except for the control layer 114. Reference 8 included the same composition as Example 5 except for the control layer 114. Reference 9 was a heat transferable inked ribbon including wax, marketed by Fuji Chemical Pulp Industries Ltd. Experiments for evaluating the heat and pressure transfer abilities were performed in the same manner as Example 4. References 7 through 9 showed insufficient heat and pressure transfer abilities. Various problems were observed on heat transfer; e.g., inferior transfer, scratching of ink by the head, color gradation, cobwebbing and orange peel due to low adhesiveness, cohesive forces, viscosity and hardness. On pressure transfer, the same problems and also incomplete transfer from the sheet to the article were observed. the hiding power of the transferred image was also not sufficient.

REFERENCES 10-12

Inked ribbons of References 10 through 12 had the similar composition to Examples 4 through 6 respectively, except for the incident rays reflecting layer 112; that is, References 10 through 12 did not contain the reflecting layer 112. Experiments for evaluating the heat and pressure transfer abilities were performed. The transferred image was not clear, but fuzzy due to the low hiding power.

As described above, the preferred first embodiment of the heat transferable linked ribbon according to the invention includes the film base coated with the ink layer, which has high pressure sensitive adhesiveness, and further with the control layer, which has high heat sensitive adhesiveness, viscosity, cohesive forces and hardness. The inked ribbon is thus efficiently and effectively transferred onto a sheet or film with poor wetting properties upon the application of heat; and the heat transferred image is also efficiently transferred from the sheet or film onto an article upon the application of pressure. Addition of the colorant to the control layer enables the transferred image to possess a sufficient hiding power even when the colorant has a low hiding power.

The preferred second embodiment of the heat transferable inked ribbon according to the invention includes the film base coated with the incident rays reflecting layer, which contains white pigment and has high pressure sensitive adhesiveness, with the ink layer, which has high pressure sensitive adhesiveness, and further with the control layer, which has high heat sensitive adhesiveness, viscosity, cohesive forces and hardness. The inked ribbon is thus efficiently and effectively transferred onto a sheet or film with poor wetting properties upon the application of heat; and the heat transferred image is also efficiently transferred from the sheet or film onto an article upon the application of pressure. The incident rays reflecting layer enables the transferred image to possess a sufficient hiding power.

What is claimed is:

1. A heat transferable inked ribbon for transferring an image onto a sheet or film upon the application of heat, wherein said image is capable of being retransferred,
   said ribbon comprising: a base film, an ink layer in contact with said base film and a control layer disposed over said ink layer;
   said ink layer containing a first colorant, a binder and a pressure sensitive adhesive; and
   said control layer containing a thermoplastic resin, a tackifying resin, and a second colorant which is not talc or titanium dioxide and having a higher viscosity, heat sensitive adhesiveness, cohesive forces and hardness than said ink layer.

2. A heat transferable inked ribbon for transferring an image onto a sheet or film upon the application of heat, wherein said image is capable of being retransferred,
   said ribbon comprising: a base film, an incident light rays reflecting layer in contact with said base film, an ink layer disposed over said reflecting layer, and a control layer further disposed over said ink layer;
   said incident light rays reflecting layer containing a white pigment, a binder and a pressure sensitive adhesive;
   said ink layer containing a colorant which is different than the white pigment, a binder, and a pressure sensitive adhesive; and
   said control layer containing a thermoplastic resin and a tackifying resin and having a higher viscosity, heat sensitive adhesiveness, cohesive forces and hardness than said ink layer.

3. A heat transferable inked ribbon as claimed in claim 1, wherein the second colorant is selected from the group consisting of carbon black, iron oxide, white lead, red lead, chrome yellow, vermilion, ultramarine blue, iron blur, cobalt oxide, strontium chromate, titanium yellow, black-titanium oxide, black iron oxide, molybdenum white, lithopone, cobalt blue, azo, phthalocyanine blue, lake, isoindolinone, quinacridone, dioxazineviolet, perinone, perylene, disperse dyes, cationic dyes, basic dyes, acid dyes, metal complex dyes, reactive dyes, direct dyes, sulphur dyes, sulphur vat dyes, vat dyes, azoic dyes, solvent dyes and pigment resin colors.

4. A heat transferable inked ribbon as claimed in claim 1, wherein said base film is composed of a material resistible to 150° C. or higher.

5. A heat transferable inked ribbon as claimed in claim 2, wherein said base film is composed of a material resistible to 150° C. or higher.

6. A heat transferable inked ribbon as claimed in claim 1, wherein said binder of said ink layer further contains a wax and a tackifying resin in the weight ratio of between 15:1 and 3:2.

7. A heat transferable inked ribbon as claimed in claim 2, wherein said binder of said ink layer further contains a wax and a tackifying resin in the weight ratio of between 15:1 and 3:2.

8. A heat transferable inked ribbon as claimed in claim 6, wherein said wax is chosen from vegetable waxes such as candelilla wax, carnauba wax, rice wax and Japan wax, animal waxes such as beeswax, lanolin and spermaceti, mineral waxes such as montan wax and ceresin, crystalline waxes such as paraffin wax and microcrystalline wax, and plastic wax such as α-olefin-maleic anhydride copolymer.

9. A heat transferable inked ribbon as claimed in claim 6, wherein said tackifying resin is chosen from petroleum resins, rosin, ketone resins, polyamide resins and phenol resins.

10. A heat transferable inked ribbon as claimed in claim 1, wherein said ink layer contains said first colorant, said binder and said pressure sensitive adhesive in a weight ratio of 5 through 50:30 through 93:2 through 20.

11. A heat transferable inked ribbon as claimed in claim 2, wherein said ink layer contains said colorant, said binder and said pressure sensitive adhesive in a weight ratio of 5 through 50:30 through 93:2 through 20.

12. A heat transferable inked ribbon as claimed in claim 10, wherein said ink layer has a viscosity of lower than 3,000 centipoise, and preferably in the range 200 through 1,000 centipoise at 95° C.

13. A heat transferable inked ribbon as claimed in claim 2, wherein said white pigment of said incident rays reflecting layer is chosen from titanium oxide, zinc oxide and lithopone.

14. A heat transferable inked ribbon as claimed in claim 2, wherein said binder of said incident rays reflecting layer contains a wax and a tackifying resin in a weight ratio of between 1:0 and 3:2.

15. A heat transferable inked ribbon as claimed in claim 14, wherein said wax is chosen from vegetable waxes such as candelilla wax, carnauba wax, rice wax and Japan wax, animal waxes such as beeswax, lanolin and spermaceti, mineral waxes such as montan wax and ceresin, crystalline waxes such as paraffin wax and microcrystalline wax, and plastic wax such as α-olefin-maleic anhydride copolymer.

16. A heat transferable inked ribbon as claimed in claim 14, wherein said tackifying resin is chosen from petroleum resins, rosins, ketone resins, polyamide resins and phenol resins.

17. A heat transferable inked ribbon as claimed in claim 2, wherein said incident light rays reflecting layer contains said white pigment, said binder and said pressure sensitive adhesive in said weight ratio of 5 through 50:30 through 93:0 through 20.

18. A heat transferable inked ribbon as claimed in claim 17, wherein said incident light rays reflecting layer has a viscosity of lower than 3,000 centipoise, and preferably 50 through 1,000 centipoise at 95° C.

19. A heat transferable inked ribbon as claimed in claim 1, wherein said thermoplastic resin of said control layer is chosen from ethylene-vinyl acetate copolymer, poly(vinylacetate), ionomer, acrylic polymer, ethylene-ethyl acrylate copolymer, ethylene-ethyl acrylate copolymer, vinyl chloride-vinyl acetate copolymer, poly(-vinyl butyral), poly(vinylpyrrolidone), poly(vinyl alcohol), polyamide, ethyl cellulose and polyolefin.

20. A heat transferable inked ribbon as claimed in claim 2, wherein said thermoplastic resin of said control layer is chosen from ethylene-vinyl acetate copolymer, poly(vinylacetate), ionomer, acrylic polymer, ethylene-ethyl acrylate copolymer, ethylene-ethyl acrylate copolymer, vinyl chloride-vinyl acetate copolymer, poly(-vinyl butyral), poly(vinylpyrrolidone), poly(vinyl alcohol), polyamide, ethyl cellulose and polyolefin.

21. A heat transferable inked ribbon as claimed in claim 1, wherein said tackifying resin of said control layer is chosen from petroleum resins, rosins, water-containing rosins, rosin esters, ketone resins, and phenol resins.

22. A heat transferable inked ribbon as claimed in claim 2, wherein said tackifying resin of said control layer is chosen from petroleum resins, rosins, water-containing rosins, rosin esters, ketone resins, and phenol resins.

23. A heat transferable inked ribbon as claimed in claim 1, wherein said control layer contains said thermoplastic resin, said tackifying resin and said second colorant in a weight ratio of 5 through 10:5 through 10:1 through 20.

24. A heat transferable inked ribbon as claimed in claim 2, wherein said control layer contains said thermoplastic resin and said tackifying resin in a weight ratio of 5 through 10:5 through 10.

25. A heat transferable inked ribbon as claimed in claim 2, wherein said control layer further contains a dye or a pigment.

26. A heat transferable inked ribbon as claimed in claim 24, wherein said control layer has a viscosity of 3,000 centipoise or higher, and preferably higher than 10,000 centipoise at 95° C.

* * * * *